United States Patent
Marshall

(10) Patent No.: US 7,139,040 B2
(45) Date of Patent: Nov. 21, 2006

(54) METHOD TO CORRECT NON-PERIODIC INDEX EVENT TIME-OF-ARRIVAL DATA IN A SYNCHRONIZATION SYSTEM

(75) Inventor: Stephen W. Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 504 days.

(21) Appl. No.: 10/747,493

(22) Filed: Dec. 29, 2003

(65) Prior Publication Data

US 2005/0162571 A1  Jul. 28, 2005

(51) Int. Cl.
*H04N 9/12* (2006.01)
*H04N 5/05* (2006.01)
*H04N 5/45* (2006.01)
*H03L 7/00* (2006.01)
*H02P 23/00* (2006.01)
*H02P 25/00* (2006.01)
*H02P 27/00* (2006.01)
*H02P 27/04* (2006.01)

(52) U.S. Cl. ............ 348/743; 348/270; 348/524; 348/536; 348/537

(58) Field of Classification Search ............ 348/743, 348/270, 536, 537, 524; H04N 9/12, 5/05, H04N 5/45; H03L 7/00
See application file for complete search history.

(56) References Cited

U.S. PATENT DOCUMENTS

| | | | |
|---|---|---|---|
| 5,355,234 A * | 10/1994 | Kim | 358/512 |
| 5,365,283 A | 11/1994 | Doherty et al. | |
| 5,448,314 A | 9/1995 | Heimbuch et al. | |
| 5,528,317 A * | 6/1996 | Gove et al. | 348/743 |
| 5,625,424 A * | 4/1997 | Conner et al. | 348/743 |
| 5,657,099 A | 8/1997 | Doherty et al. | |
| 5,691,780 A | 11/1997 | Marshall et al. | |
| 5,774,196 A | 6/1998 | Marshall | |
| 5,774,387 A | 6/1998 | Marshall | |
| 5,880,573 A | 3/1999 | Marshall et al. | |
| 6,002,452 A | 12/1999 | Morgan | |
| 6,738,104 B1 * | 5/2004 | Marshall | 348/743 |
| 6,755,554 B1 * | 6/2004 | Ohmae et al. | 362/293 |
| 6,972,777 B1 * | 12/2005 | Shigeta | 345/690 |
| 7,004,604 B1 * | 2/2006 | Ohmae et al. | 362/268 |
| 2001/0043289 A1 | 11/2001 | Marshall | |

* cited by examiner

*Primary Examiner*—Brian P. Yenke
(74) *Attorney, Agent, or Firm*—Charles A. Brill; Wade James Brady, III; Frederick J. Telecky, Jr.

(57) ABSTRACT

A system and method for correcting non-periodic event time of arrival data in a control system. The system and methods are particularly applicable to the speed and phase control of a color wheel used with spatial light modulators. The circuitry automatically and accurately compensates for non-periodic index signals occurring when one or more index marks on the color wheel are misplaced. The system adds to or subtracts clock pulses from the actual time of arrival of a specific index mark until the corrected value equals the desired or nominal value. The system then generates a PWM signal for controlling the speed and phase of the color wheel.

19 Claims, 4 Drawing Sheets

METHOD TO CORRECT NON-PERIODIC INDEX EVENT TIME-OF-ARRIVAL DATA IN A SYNCHRONIZATION SYSTEM

The present invention is related to commonly-assigned U.S. patent application Ser. No. 09/792,206, entitled "Robust Color Wheel Phase Error Method for Improved Channel Change Re-lock Performance," filed Feb. 23, 2001, which application is incorporated herein by reference as if repeated in its entirety.

TECHNICAL FIELD

The present invention relates generally to a system and method to synchronize the occurrence of a set of events with periodic sync pulses, and more particularly to such a system and method for synchronizing the speed and phase of a color wheel with the periodic occurrence of a frame sync pulse used by a spatial light modulator to generate color images.

BACKGROUND

Generally, when used with circuitry operating a spatial light modulator, a color wheel used for generating high quality color images on a display has a single index mark that is sensed and used to synchronize the phase and speed of the color wheel with an image frame sync pulse. More specifically, a spatial light modulator, such as for example, a DMD™ (digital micromirror device) spatial light modulator available from Texas Instruments Incorporation in Dallas, Tex., uses such a color wheel.

The very high operating speed of the DMD™ and the continuous demand for higher and higher quality color images emphasizes the need for color wheels with extremely stable speed and phase control. More specifically, because of the high rotational speed of a color wheel and the high color cycle rate needed for high quality color images, a color wheel that is rotating at a slightly incorrect speed or that is only slightly out of phase may be producing one color when the system is expecting another color.

Therefore, to avoid such problems, speed and phase correction of the color wheel are now needed to compensate for speed and/or phase variations that occur during a single revolution of the color wheel. Prior attempts to provide such minute control of the color wheel have been attempted by simply increasing the number of index marks on the color wheel so that the control circuitry will receive an index or event pulse at a more frequent rate. For example, if four index marks are evenly placed around the color wheel, the control circuitry can detect a speed or phase variation four times faster than with a single index mark. This would appear to be a simple and good solution, but unfortunately because it is very difficult to precisely space the index marks evenly around the wheel, the addition of index marks may not provide any improvement. Attempts to average the timing of the index marks or to calibrate the circuitry to compensate for these placement errors have not been particularly successful.

Therefore, it would be advantageous to produce synchronization apparatus and methods that would automatically and accurately compensate for the non-periodic arrival of index events or signals such as caused by placement errors of the index marks on a color wheel.

SUMMARY OF THE INVENTION

These and other problems are generally solved or circumvented, and technical advantages are generally achieved, by preferred embodiments of the present invention that provide apparatus and methods to correct non-periodic event time of arrival data in a control system.

The system includes a clock source for providing clock pulses at a selected rate and an input for receiving a series of index signals representing event time of arrival data such as the occurrence of a plurality of index marks on a color wheel, and wherein at least one of the event signals occur non-periodically, such as would occur by one of the index marks not being accurately placed. A register stack is included for storing a correction value for each of the individual index signals. Another register is provided for repeatedly storing a "corrected" data value representative of the number of clock pulses between successive index signals. The "corrected" data value is the sum of the measured number of clock pulses plus a corresponding one of a correction value associated with a specific index signal.

The repeatedly stored data value is compared with an average or nominal value of the desired number of clock pulses between successive index signals. The stored correction value or data for each individual index signal is then incremented when the comparison is negative and decremented when the comparison is positive. If the two values being compared are equal, the correction register is neither incremented nor decremented.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed could be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a color wheel for color displays. The invention may also be applied, however, to other synchronization and control systems that use non-periodic time of arrival index signals.

Figure 1:
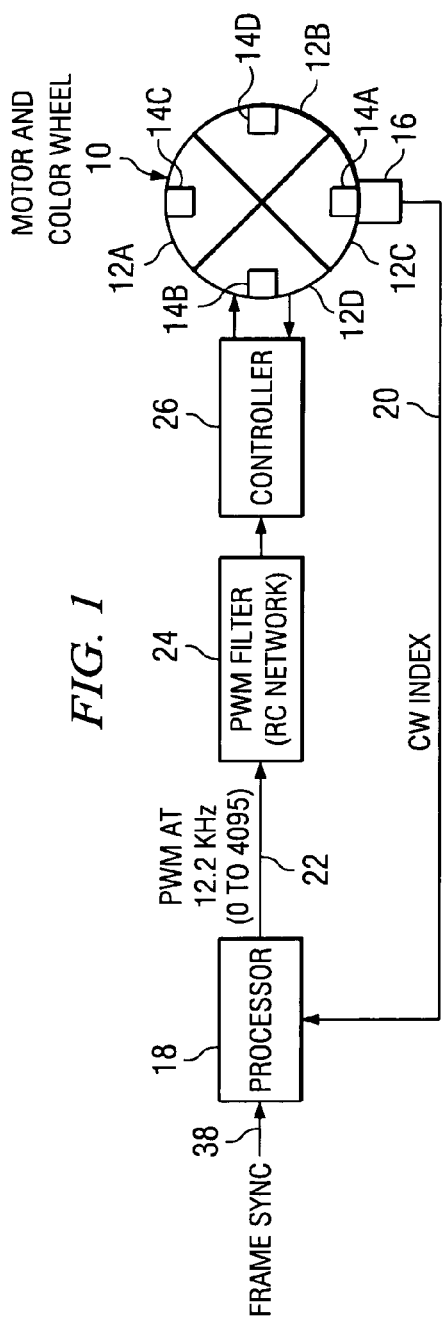
FIG. 1 is a block diagram of a color wheel and typical circuitry for controlling the speed and phase of the color wheel in response to sensing the occurrence or passing of index marks located on the color wheel.

Referring now to FIG. 1, there is shown a general block diagram of the circuitry used for controlling the speed and phase of a color wheel suitable for use with a spatial light modulator. The concepts of this invention are particularly suitable for use with a DMD™ (digital micromirror device) spatial light modulator available from Texas Instruments Incorporated in Dallas, Tex. As shown, color wheel 10 includes segments or sectors of different colors. The color wheel 10 will typically have at least three sectors of different primary colors such as red, green and blue. However, even when these three primary colors of red, green and blue are used, it is not uncommon that the color wheel will have four or even more sectors such as the four sectors 12a, 12b, 12c and 12d shown in FIG. 1. Three of the sectors will typically be red, green and blue. However, the additional sectors could be any desired color including transparent (i.e., for white light), a repeat of one of the primary colors (for example, a second red sector), or one or more secondary colors. Other color wheel embodiments wrap multiple color segments around the wheel in a spiral fashion.

In any event, the very high rotational speed of the color wheel and the high color cycle rates necessary to produce high quality color images require very accurate synchronization of the phase and speed of the color wheel to the generation of the image or frame image bits or pixels.

Prior art color wheel arrangements typically included a single index mark such as index mark 14a that passes a sensor 16 one time for each revolution of the color wheel. Thus, a single index pulse was generated by sensor 16 for each revolution of the color wheel. The single index mark or pulse per revolution of the color wheel provides an excellent indication of the average speed of a color wheel and allows for straightforward speed control circuitry. Unfortunately, variations or speed changes that occur during a single revolution of the wheel cannot be controlled or compensated for. The high color cycle rates and color wheel speeds, however, require tighter control of the color wheel speed and phase to eliminate artifacts generated by very minute variations in the color wheel speed and phase during a single revolution.

To provide such tighter control of the color wheel speed and phase, additional index marks may be equally spaced around the color wheel such as index marks 14b, 14c and 14d illustrated in FIG. 1. The addition of three more index marks will of course result in a total of four index signals being generated during each revolution of the color wheel. This means that speed and/or phase variations can be detected and compensated for several times during a single revolution of the color wheel. If the index marks could be precisely and equally spaced about the wheel, then the presently available control circuitry would be operating four times faster and would be sufficient.

Unfortunately, the index marks simply cannot be as precisely placed or located as is necessary, and therefore, the speed control and phase control processing circuitry 18 must adjust for the non-periodic time of arrival of the index marks or signals from sensor 16 on connection or line 20. Once the adjustments are made for the non-periodic time of arrival of the index marks, processor circuitry 18 will provide an output signal such as a PWM (pulse width modulation) signal on line 22 to a PWM filter 24 such as an RC network. The filtered PWM signal is then provided to motor controller 26 to provide the necessary drive signal to maintain the desired speed and phase of the color wheel.

Figure 2:
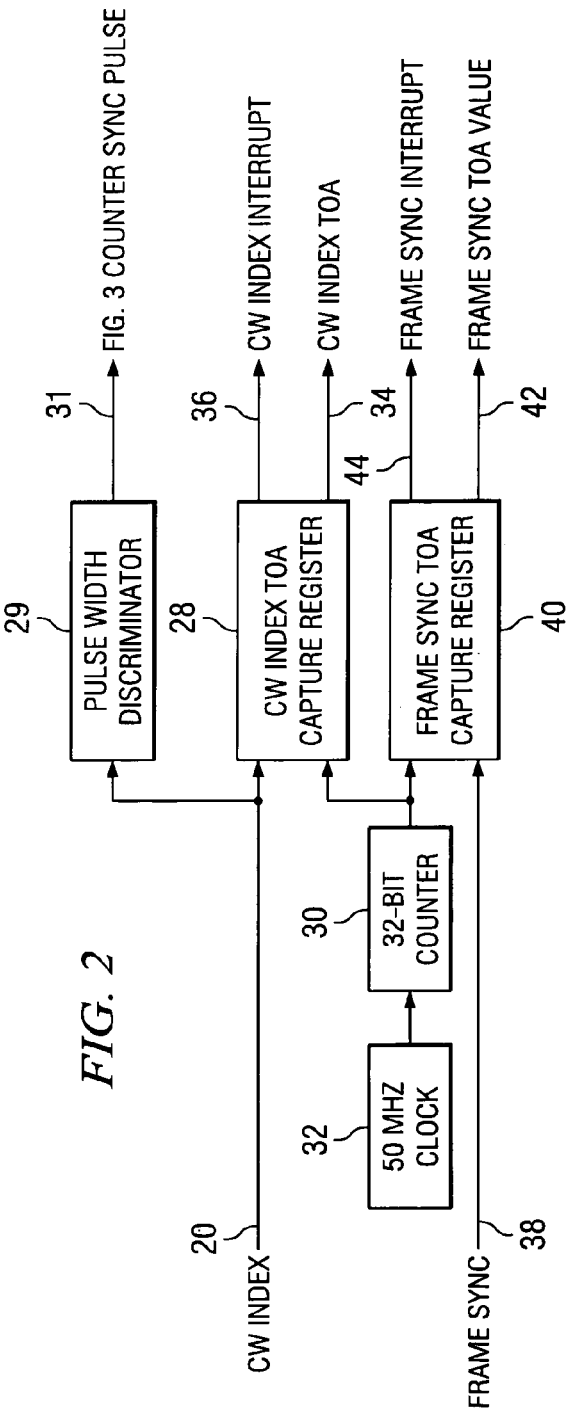
FIGS. 2 and 3 are block diagrams of different processing elements for generating a phase error signal and a speed error signal in response to sensing index marks on the color wheel and the occurrence of a display sync signal.
Figure 3:
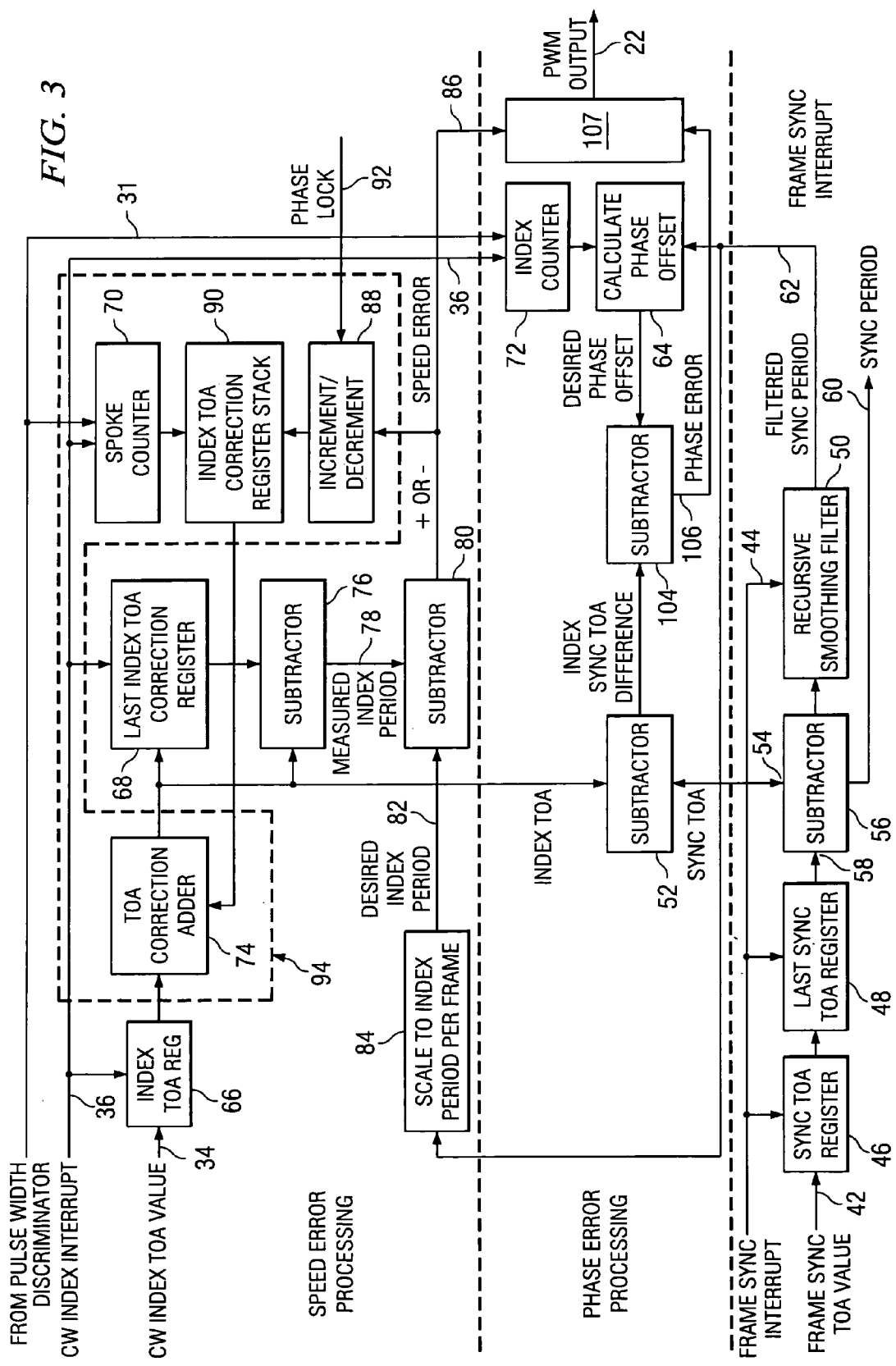

FIGS. 2 and 3 are block diagrams of the processing circuitry 18 for providing the PWM signal on line 22 used to control the speed and phase of color wheel 10. Referring to FIG. 2, signals from sensor 16 representing the sensing of an index mark on the color wheel are provided by line 20 to a color wheel TOA (time of arrival) register 28 and to a Pulse Width Discrimination circuit 29. Register 28 also receives the output of 32-bit counter 30. Counter 30 receives and counts clock pulses received from a clock source such as the 50 MHz clock pulses from clock 32 illustrated in FIG. 2. Therefore, register 28 captures the output count from counter 32 each time a signal pulse is received on line 20 indicating that a color wheel index mark passed sensor 16 as shown in FIG. 1. The captured output count or TOA value is then provided on line 34 along with an interrupt signal on line 36 to the "Speed Error Processing" circuitry illustrated in FIG. 3 and to be discussed hereinafter. The Pulse Width Discrimination circuit 29 identifies the "primary" index mark and is used to synchronize the spoke and index counters to be discussed later. More specifically, and as an example only, the "primary" index mark may be twice as wide such that the pulse representative of the primary mark is about twice as wide as the pulses representing the other index marks. Thus, the Pulse Width Discrimination circuit 29 will provide output pulses or "counter" sync pulses on line 31 every time the primary mark passes sensor 16. The interrupt signal on line 36 is also provided to the "Phase Error Processing" circuitry also illustrated in FIG. 3.

Referring again to FIG. 2, a frame sync pulse is received from image processing circuitry (not shown) on line 38 and provided to the frame sync TOA register 40. In the same manner as was discussed above with respect to capturing the TOA of an index mark signal, register 40 also receives the output of 32-bit counter 30. However, register 40 captures the TOA of the frame sync pulse, and provides the captured frame sync TOA value along with a "Frame Sync Interrupt" signal on lines 42 and 44, respectively, to frame sync interrupt circuitry also illustrated in FIG. 3.

Therefore, referring to FIG. 3, the frame sync interrupt pulse on line 44 and the frame sync TOA value or count are both provided to "Sync TOA" register 46. The same frame sync interrupt pulse is also provided on line 44 to "Last Sync TOA" register 48 and to a recursive smoothing filter 50, to be discussed below.

Thus, the "Sync TOA" register 46 stores the TOA value present on line 42. Any data already in register 46 is overwritten. Further, any such previously stored data in register 46 will have been made available to a Subtraction Circuit 52 in the phase error processing portion of the circuitry of FIG. 3 and also to "Last Sync TOA" register 48 and to port 54 of Subtraction Circuitry 56 in the frame sync interrupt portion of the circuitry of FIG. 3. However, as mentioned above, "Last Sync TOA" register 48 also receives the frame sync interrupt signal on line 44 at the same time the "sync TOA" register 46 receives an interrupt signal.

Therefore, just as "Sync TOA" register 46 receives and stores new TOA values available on line 42, "Last Sync TOA" register 48 receives and stores the data previously stored in "Sync TOA" register 46. The previous contents of "last sync TOA" register 48 are also available for use at port 58 of Subtraction Circuitry 56. Subtraction Circuitry 56 now compares or subtracts the older value received at port 58 from the newer value received at port 54 to provide the resulting difference value to recursive smoothing filter 50 and as a "sync period" signal on line 60. As shown, recursive smoothing filter 50 then provides a filtered "sync period" signal on line 62 to circuitry 64, which calculates a phase offset value. The filtered "sync period" signal is also provided on line 62 to scaling circuitry 84 in the "Speed Error Processing" portion.

As shown, the "Speed Error Processing" portion of the circuitry of FIG. 3, and a signal representing a color wheel index mark time of arrival data is received on line 34. An interrupt signal indicating the time of arrival data is available is received on line 36. The index TOA value or data available on line 34 at the time the interrupt signal on line 36 is stored in "Index TOA" register 66. It is also noted that, in addition to "Index TOA" register 66, the interrupt signal on line 36 is also made available to the "Last Index TOA+Correction" register 68, spoke counter 70 and index counter 72, all to be discussed below. The "Index TOA" register 66 and the "Last Index TOA" register 68 operate similarly to the "Sync TOA" register 46 and "Last Sync TOA" register 48 discussed above, except that according to this invention, there is included the TOA correction adder circuit 74 that adds a correction count to the index TOA value received from register 66 before this data is received at the "Last Index TOA" register 68 and Subtraction Circuitry 76 and 52. Thus as seen, the Subtraction Circuitry 76 subtracts a previous or "Last Index TOA" value that has been adjusted by a correction count from a current value that includes the current "Index TOA" value plus a new correction value or count. The result of this subtraction step represents a "corrected" number of clock pulses that have occurred between index mark signals. This corrected output count is provided on line 78 to another Subtraction Circuitry 80 that compares the corrected count value received on line 78 with a nominal count. The nominal count is received on line 82 from scaling circuitry 84. Scaling circuitry 84 scales the filtered sync period value to generate a data count representing the number of clock pulses or counts that would occur between consecutive index marks if the marks were precisely and evenly placed on the color wheel. Subtraction Circuitry 80 then provides its results as a "speed error" on line 86 to the circuitry 107 illustrated in detail in FIG. 5, which uses a "phase error" to be discussed below and the "speed error" to calculate a PWM output that will be filtered by network 24 and used by controller 26 to control the speed and phase of the color wheel drive motor. However, as shown, the "speed error" signal is also provided to Increment/Decrement circuitry 88, which determines whether the speed error signal is a positive or negative signal. If the value of the speed error signal is positive, a Decrement signal is provided to the "Index TOA Correction" register stack 90, and if the "speed error" signal is negative, an Increment signal is provided to register 90. The Increment and Decrement values may be 1 or more. Register stack 90 maintains a "correction value" for each index mark on the color wheel. Thus, as shown, spoke counter circuit 70 and index counter 72 each receive a "counter" sync pulse on line 31 from the Pulse Width Discrimination circuit 29. This pulse allows the spoke counter circuit 70 and index counter 72 to determine and keep track of which index mark generates each specific color wheel interrupt signal. This information is used to select the appropriate register in register stack 90 that stores the correction value that is to be incremented, decremented or left unchanged. The appropriate correction value for each index mark is then provided to a "TOA correction" circuit 74. The TOA correction value associated with the primary index mark 0 is always set to zero. This forces the correction values associated with all other index marks to be with respect to index mark 0. As discussed above, the addition of an index mark Pulse Width Discrimination circuit is a further refinement that can identify index mark 0. This circuit is used to synchronize the actions of the spoke counter 70 and the index counter 72 to establish the proper alignment of the color wheel segment pattern with respect to the frame sync.

It should be noted that Increment/Decrement circuitry 88 is disabled until the drive motor and color wheel achieve phase lock and a signal indicating phase lock is received on line 92.

Figure 4:
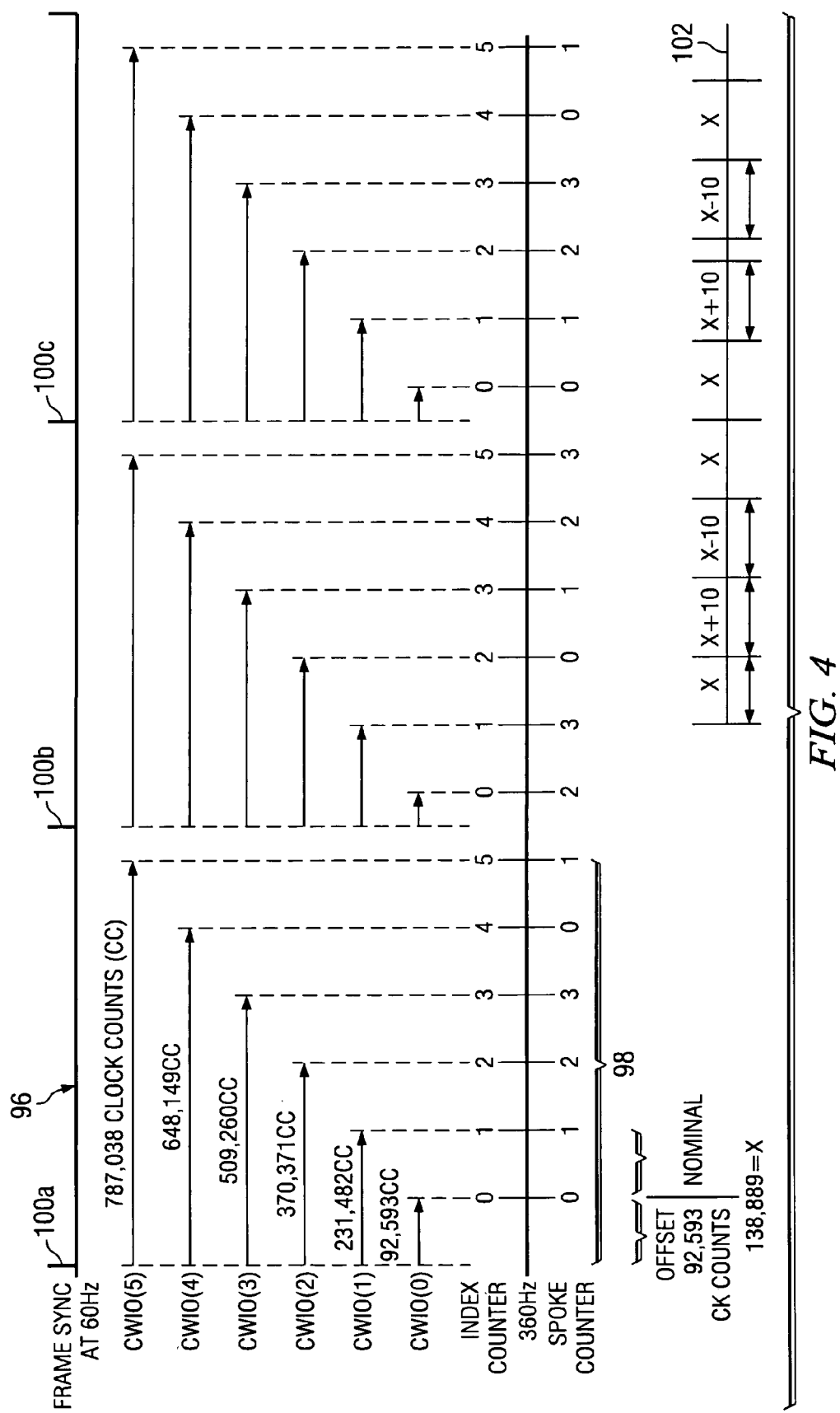
FIG. 4 includes a series of graphs or timing charts illustrating the occurrence of sync signals and the time of arrival of index mark signals.

Referring now to FIG. 4, there is a series of timing graphs to help explain the operation of TOA correction circuitry indicated at 94 in FIG. 3. As shown, graph 96 illustrates the occurrence of the frame sync pulses, which in the example, occur at a rate of 60 Hz. Graph 98 illustrates the desired or nominal occurrence of signal pulses representing the sensing of the four index marks 14a, 14b, 14c and 14d when the color wheel is rotating with a desired shaft speed of 90 Hz. However, since there are four index marks on the color wheel, the color wheel (CW) index signals will occur at a rate of 360 Hz. Therefore, if a 50 MHz clock is used such as indicated in FIG. 2, there will be 833,334 clock counts between frame sync pulses 100a and 100b. (A similar number of counts also of course occurs between sync pulses 100b and 100c.) Since the CW index rate is 360 Hz or six times the speed of the frame sync pulses, these CW index pulses should be separated by a nominal value of 138,889 clock counts (i.e., 833,334/6=138,889).

Therefore, assuming four index marks designated as "0", "1", "2" and "3", and further assuming the initial index mark "0" is offset, a selected value such as 92,593 clock counts to achieve optimum color wheel alignment as determined by phase offset calculation circuitry 64 then the occurrence of the index marks would occur at the clock count values illustrated in FIG. 4 for the six pulses. It should be noted that since there are six pulses for frame sync pulse generated by only four index marks, two of the index marks will occur twice during a frame.

However, as stated above, the counts between index marks illustrated in FIG. 4 would be correct only if the index marks were precisely placed and evenly spaced. Since such precision placement of the mark almost never occurs, graph 102 illustrates an example when mark "1" is slightly misplaced. As shown, the count between index marks "0" and "1" is X+10 where "X" equals the nominal clock counts between color wheel index marks of 138,889 counts. Therefore, according to the example at graph 102, the clock counts between index marks "0" and "1" is 138,899 rather than 138,889 and, therefore, the total clock count from the frame sync pulse to the occurrence of the index mark "1" will be 231,492 rather than 231,482. In a similar manner, since mark "1" is misplaced and mark "2" is placed correctly, the distance between marks "1" and "2" will be less than nominal and the clock counts will be minus ten or ten counts less than nominal. This, of course, makes sense, since if mark "0" and "2" are properly placed, then the count error between marks "0" and "1" due to misplacement of mark "1" must be made up by an opposite error between marks "1" and "2". It should be realized that the above example only describes one misplaced mark. For example, mark "2" could also be slightly misplaced such that the clock count between marks "1" and "2" could only make up a portion of the total of the ten count error between marks "0" and "1". In that situation, the remaining counts may be made up by the clock counts between marks "2" and "3".

Therefore, referring again to FIG. 3 and graph 102 of FIG. 4, it is seen that after the color wheel achieves phase lock, it will take ten revolutions of the color wheel to correct for the placement error. That is, the correction register stack for the number of clock counts between index mark "0" and "1" will be decremented one count for each occurrence of index mark "1" for ten revolutions. After ten revolutions, the adder circuit 74 will have added ten clock counts such that, absent other outside forces affecting the speed of the color wheel, the values for a current value index TOA compared to a previous value will be the same. The same process occurs for the minus ten count between index mark "1" and "2" except that the TOA correction register for mark "2" is incremented rather than decremented.

Therefore, any future "speed error" signal provided on line 86 represents an actual speed deviation and not an error due to misplacement of an index mark.

A phase error is determined by Subtraction Circuit 104 receiving the desired phase offset of a count (i.e., 92,593 clock counts in the above example) from Phase Offset Calculation circuitry 64 and a value equal to the difference between the corrected index TOA count and sync TOA count from subtraction circuitry 52. Subtraction Circuitry 104 then compares these values to determine the value of a phase error (if any) to be provided on line 106.

Figure 5:
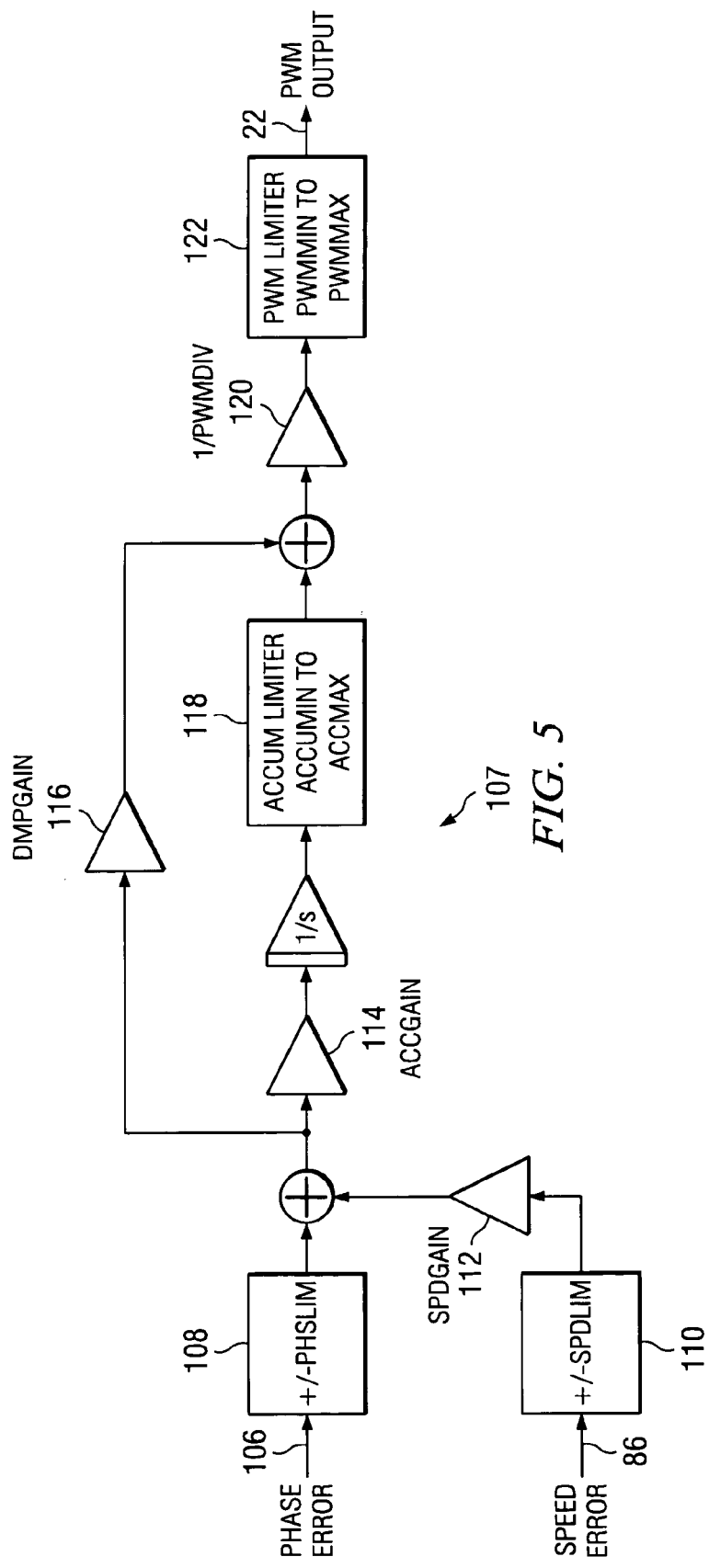
FIG. 5 is a block diagram for processing elements for receiving speed error signals and phase errors signals and generating a PWM (pulse width modulated) output signal for controlling the color wheel.

The speed error on line 86 and the phase error on line 106 are then provided to a PWM circuitry 107 that uses these two errors in a manner well known by those skilled in the art to calculate a PWM output control signal. FIG. 5 illustrates suitable circuitry as known by those skilled in the art where PHSLIM limiter circuitry 108 and SPDLM limiter circuitry 110 are used to limit the phase and speed errors respectively. The amplifier circuits 112, 114 and 116, respectively, represent gain values for speed error, the accumulator and dampening, respectively. Limiting circuitry 118 limits the maximum and minimum values, respectively, and the one over PWMDIV amplifier 120 is a PWM divider. PWM limiter circuitry 122 provides the maximum and minimum limits allowed for the PWM output on line 22.

Finally, as briefly discussed above, the PWM output on line 22 is filtered by an RC network filter 24 and provided as a control signal to controller 16.

The processing functions of the preferred embodiment illustrated as block diagrams in FIGS. 3 and 5 may be realized as an electronic circuit or as sequential logic software in a microprocessor solution. Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to correct non-periodic index event time-of-arrival data in a control circuitry comprising the steps of:
    providing clock pulses at a selected rate;
    receiving a series of index signals representing event time of arrival data, at least one of said event signals occurring non-periodic;
    storing a value for correcting each index signal;
    repeatedly storing a corrected value representing a corresponding one of said value for correcting combined with the number of clock pulses occurring between successive index signals;
    comparing said repeatedly stored corrected values with a value representative of the nominal number of clock pulses between successive index signals;
    incrementing said correction value when said comparison is negative; and
    decrementing said correction value when said comparison is positive.

2. The method of claim 1 wherein said step of receiving comprises the steps of rotating a color wheel having a selected number of index marks spaced around said color wheel;
    monitoring the occurrence of said index marks at a selected location and position, at least one of said index marks occurring non-periodic; and
    transmitting a signal representative of said occurrence of said index marks.

3. The method of claim 2 further comprising adjusting the speed of said rotating color wheel in response to said repeatedly stored values.

4. The method of claim 2 wherein said color wheel has a rotational speed of 5,400 RPM.

5. The method of claim 2 wherein said selected number of index marks is 4.

6. The method of claim 2 wherein said rotating color wheel achieves phase-lock before said incrementing and decrementing steps.

7. The method of claim 2 further comprising the step of receiving a signal representative of the occurrence of a "primary" index mark.

8. The method of claim 7 further comprising the step of using said signal representing said "primary" index mark to synchronize said value for correcting each index signal with the appropriate index mark.

9. The method of claim 1 wherein the number of clock pulses between successive index signals is determined by comparing the value of a free running counter associated with the occurrence of an index signal with the value of said counter at a subsequent occurrence of said index signal.

10. The method of claim 1 wherein said selected rate of said clock pulses is 50 MHz.

11. Correction apparatus for correcting non-periodic index events time-of-arrival data in control circuitry comprising:
    a series of clock pulses having a selected rate;
    a series of index signals representing event time of arrival data, at least one of said event signals occurring non-periodic;
    a register for storing a correction value associated with each index signal;

a second register for repeatedly storing a value representative of the number of clock pulses occurring between successive index signals adjusted by an appropriate one of said corrective values;

circuitry for comparing said repeatedly stored values with a nominal value representing the number of clock pulses between successive index signals;

circuitry for incrementing said correction value by one or more when said comparison value is negative; and circuitry for decrementing said correction value by one or more when said comparison value is positive.

12. The apparatus of claim 11 further comprising:

a color wheel having a selected number of index marks spaced around said color wheel;

a drive source for rotating said color wheel at a selected speed; and a sensor for monitoring the passing of an index mark on said color wheel and for providing said series of index signals indicative thereof.

13. The apparatus of claim 12 further including circuitry for adjusting the speed of said rotating color wheel in response to said repeatedly stored value.

14. The apparatus of claim 12 wherein said number of index marks is 4.

15. The apparatus of claim 11 wherein said rate of said clock pulses if 50 MHz.

16. The apparatus of claim 11 wherein one of said index marks is a primary index mark and wherein said sensor for monitoring provides a wider pulse whenever said primary index mark passes said sensor.

17. The apparatus of claim 16 further comprising a Pulse Width Discrimination circuit for identifying a wide pulse, and wherein said pulse representing said primary index mark is used to associate a correction value with an index mark.

18. Correction apparatus for correcting non-periodic index events time-of-arrival data in a phase-lock loop system comprising:

means for providing clock pulses at a selected rate;

means for rotating a color wheel having a selected number of index marks spaced around said color wheel;

means for monitoring the passing of an index mark on said rotating color wheel;

means for storing a correction value for each of said index marks;

means for repeatedly storing a value representative of the number of clock pulses between successive index marks of said rotating color wheel and a corresponding one of corrective values;

means for comparing said repeatedly stored values with an average value of clock pulses between successive index marks;

means for incrementing said correction values when said comparison value is negative;

means of decrementing said correction values when said comparison value is positive.

19. The apparatus of claim 18 further comprising means for adjusting the speed of said rotating color wheel in response to said repeatedly stored values.

* * * * *